United States Patent [19]

Kerr et al.

[11] Patent Number: 5,227,771
[45] Date of Patent: Jul. 13, 1993

[54] METHOD AND SYSTEM FOR INCREMENTALLY CHANGING WINDOW SIZE ON A DISPLAY

[75] Inventors: Linda L. Kerr, North Richland Hills; Robert J. Torres, Colleyville, both of Tex.

[73] Assignee: International Business Machines Corporation, Roanoke, Tex.

[21] Appl. No.: 727,731

[22] Filed: Jul. 10, 1991

[51] Int. Cl.[5] .............................................. G09G 1/06
[52] U.S. Cl. ................................... 340/731; 340/724; 340/734; 395/157
[58] Field of Search ............... 340/721, 723, 724, 731, 340/734; 395/155, 157, 159

[56] References Cited

U.S. PATENT DOCUMENTS

| | | | |
|---|---|---|---|
| 4,574,364 | 3/1986 | Tabata et al. | 340/731 |
| 4,692,757 | 9/1987 | Tsuhara et al. | 340/731 |
| 4,831,556 | 5/1989 | Oono | 340/723 |
| 4,890,098 | 12/1989 | Dawes et al. | 340/721 |
| 4,896,148 | 1/1990 | Kurita | 340/731 |

OTHER PUBLICATIONS

"Microsoft Windows User's Guide", version 2.0 by Microsoft Corporation, 1987, pp. 6-7, 32-41 54-55, 66-75 & 96-103.

*Primary Examiner*—Tommy Chin
*Assistant Examiner*—Jick Chin
*Attorney, Agent, or Firm*—Geoffrey A. Mantooth

[57] ABSTRACT

A window displayed on a user interface can be incrementally enlarged or reduced by selecting an appropriate sizing icon. There are provided an enlarge icon and a reduce icon in the window title bar. To resize the window, the user selects the appropriate icon with the cursor. The window will change its border size according to a predetermined incremental value. The data that is displayed inside of the newly sized window is determined and then displayed. By continuously selecting one of the sizing icons, the window will be continuously sized in an incremental manner until the user terminates the selection or until the maximum or minimum window limits are reached. As the window is resized, the cursor remains attached to the selected icon. During resizing of the window, one border corner is fixed in position on the interface while the opposite border corner is moved.

17 Claims, 12 Drawing Sheets

METHOD AND SYSTEM FOR INCREMENTALLY CHANGING WINDOW SIZE ON A DISPLAY

FIELD OF THE INVENTION

The present invention relates to methods and systems for changing the size of windows presented on a computer display.

BACKGROUND OF THE INVENTION

Windows are graphical interface components that present objects and actions to computer operators. Windows are presented to operators by way of a computer display or screen. A window in effect allows a user or operator to see an image of an application that has been constructed by the computer.

One advantage of using windows is that plural applications programs as well as plural files can be accessed and used at the same time. Each file and each program runs in its own window. The screen may thus contain plural windows.

The user can adjust the size of the individual windows to see either more or less of their contents. For example, a window can be expanded to maximum size, wherein the window fills the entire display screen. Alternatively, a window can be sized smaller than the display screen so as to permit the viewing of two or more windows.

In the prior art, the size of a window is adjusted in one of two ways. To adjust the size to a maximum (so as to fill the entire screen) or to a minimum (so the window becomes an icon) maximize and minimize icons are provided on the window. The user selects the appropriate icon with the cursor and then requests action. To adjust the size of the window to sizes between maximum and minimum, the user must locate the cursor on a border of the window, request a sizing action to occur and then move the cursor to the selected location while dragging the border along. This drag method of adjusting window size is not very user friendly, because there is no icon for incremental sizing. In addition, the drag method is somewhat clumsy for a user to implement.

SUMMARY OF THE INVENTION

It is therefore an object of the present invention to provide a method and system for incrementally sizing a window on a display.

It is another object of the present invention to provide a method and system for incrementally sizing a window on a display, which method utilizes sizing icons.

The system and method of the present invention is for incrementally adjusting of the size of a window in a user interface with a data processing system. The window is displayed on the interface, with the window having data located therein. An enlarge icon and a reduce icon are displayed on the interface. A user input for changing the size of the window is detected. The input comprises a selection of either the enlarge icon or the reduce icon. A new window size is determined according to a predetermined incremental value so as to form a new window. The new data that is to be located in the new window is determined. The new window and the new data located therein is then displayed on the interface.

In one aspect of the method of the present invention, the window has plural border segments around the perimeter of the window. The step of forming the new window occurs by holding at least one border segment fixed in position on the interface while the remaining border segments move relative to the fixed border segment. In another aspect, if the border segment of the new window reaches a limit on the interface, then the fixed border segment of the new window is repositioned so that the new window can be viewed in its entirety on the interface.

In still another aspect, the user input is performed by locating an interface cursor on a selected one of the enlarge or reduce icons. The cursor is attached to the selected icon in the new window, wherein the cursor is automatically repositioned on the selected icon as the window changes size.

In still another aspect, the user is allowed to select the predetermined incremental value.

In another aspect, the method displays the window on the interface, with the window having data located therein. A user input for changing the size of the window is detected. A new window size according to a predetermined incremental value is determined so as to form a new window. New data that is to be located in the new window is determined. The new window and the new data located therein is then displayed on the interface. Then, it is determined if the user input is continuous, wherein if the user input is continuous then the window is sized again in accordance with the predetermined incremental value and displayed on the interface. This allows the user to continuously increment the size of the window to a desired size.

In another aspect of the present invention, the method displays the window on the interface, the window having data located therein. An enlarge icon and a reduce icon are also displayed on the interface. A user input for changing the size of the window is detected. The input includes a selection of either the enlarge icon or the reduce icon by a cursor on the interface. A new window size is determined according to a predetermined incremental value so as to form a new window. The new window has newly positioned enlarge and reduce icons. New data that is to be located in the new window is determined. The cursor is attached to the selected and newly positioned icon. The new window and the new data located therein are displayed on the interface.

In yet another aspect of the invention, the method displays the window on the interface, with the window having data located therein. An enlarge icon and a reduce icon are also displayed on the interface. A user input for changing the size of the window is detected. The input includes a first selection of the enlarge icon to incrementally enlarge the window, a second selection of the enlarge icon to enlarge the window to a predetermined maximum size, a first selection of the reduce icon to incrementally reduce the window and a second selection of the reduce icon to reduce the window to a predetermined minimum size. If the input includes one of the first selections of the enlarge or reduce icons, then a new window size is determined according to a predetermined incremental value so as to form a new window. If the input includes one of the second selections of the enlarge or reduce icons, then a new window size is determined according to the respective predetermined maximum or minimum sizes. New data, if any, is determined to be located in the new window. The new window of the new data located therein are displayed on the interface.

BRIEF DESCRIPTION OF THE DRAWINGS

FIG. 5 is a flow chart that describes how a window is initially constructed on the display. FIG. 6 is a flow chart that describes how user inputs are monitored and acted upon. FIG. 7 is a flow chart that describes the subroutine for incrementally increasing window size. FIG. 8 is a flow chart that describes the subroutine for adjusting the size of the windows and determining the data that is to be displayed in the newly sized window. FIG. 9 is a flow chart of the subroutine for incrementally decreasing the size of the window.

DESCRIPTION OF THE PREFERRED EMBODIMENT

Figure 1:
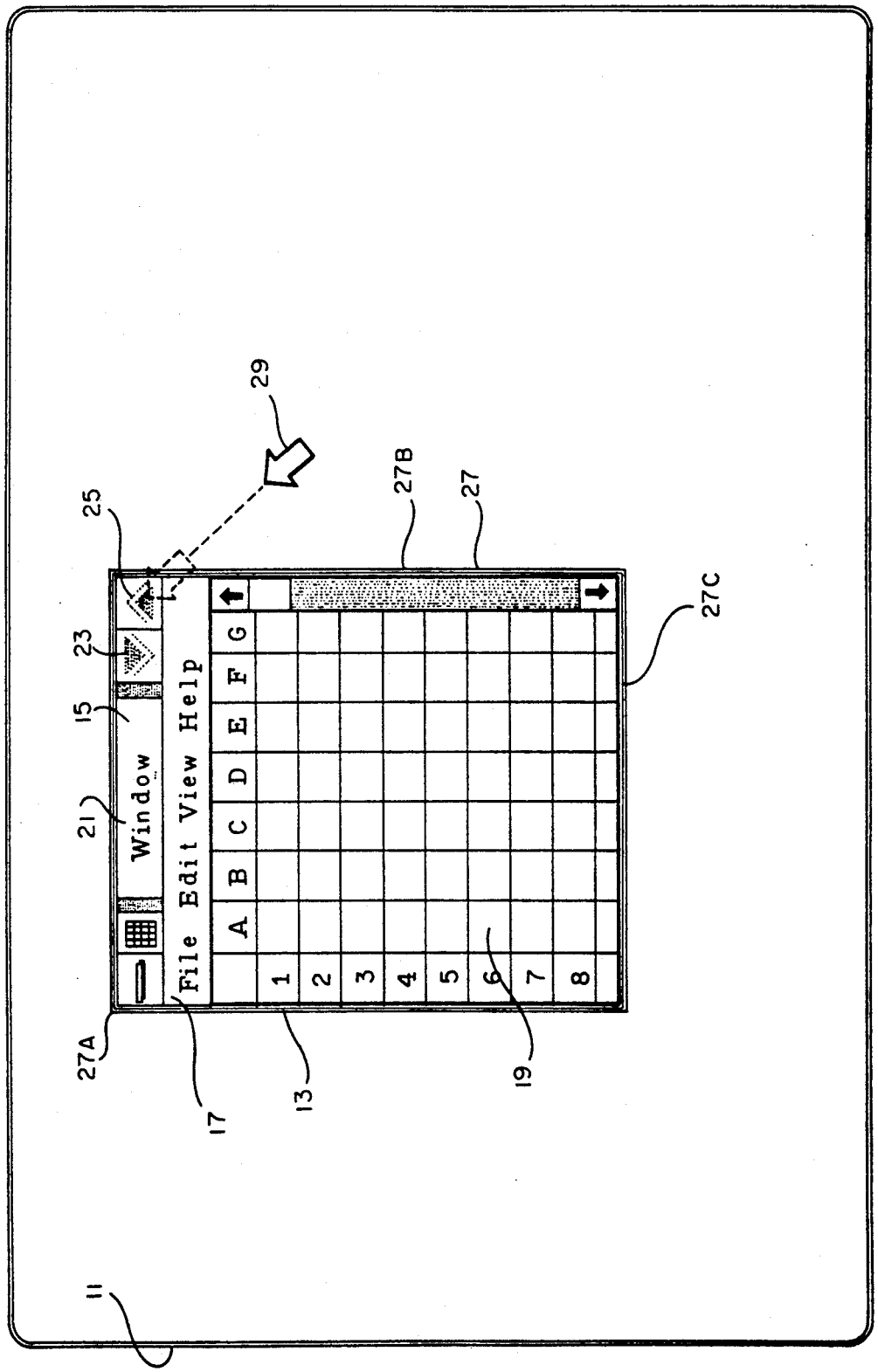
FIG. 1 is a schematic view of a computer display screen, showing a window located thereon.

In FIG. 1, there is shown a schematic representation of a computer display screen 11 or CRT monitor. Displayed on the screen 11 is a window 13. The window has a title bar 15, an action bar 17 and a client area 19. The title bar 15 contains, among other things, the window title 21 and the window sizing icons. There are a reduce icon 23 and an enlarge icon 25. The action bar 17, located just below the title bar 15, contains the actions supported by the application. The client area 19 displays the graphical image constructed by the application program running in the window. The particular application shown in FIGS. 1-4 is a conventional spreadsheet and is shown only for illustrative purposes. The window has a border 27 around its perimeter. The screen also shows a cursor in the form of a mouse pointer 29.

Figure 2:
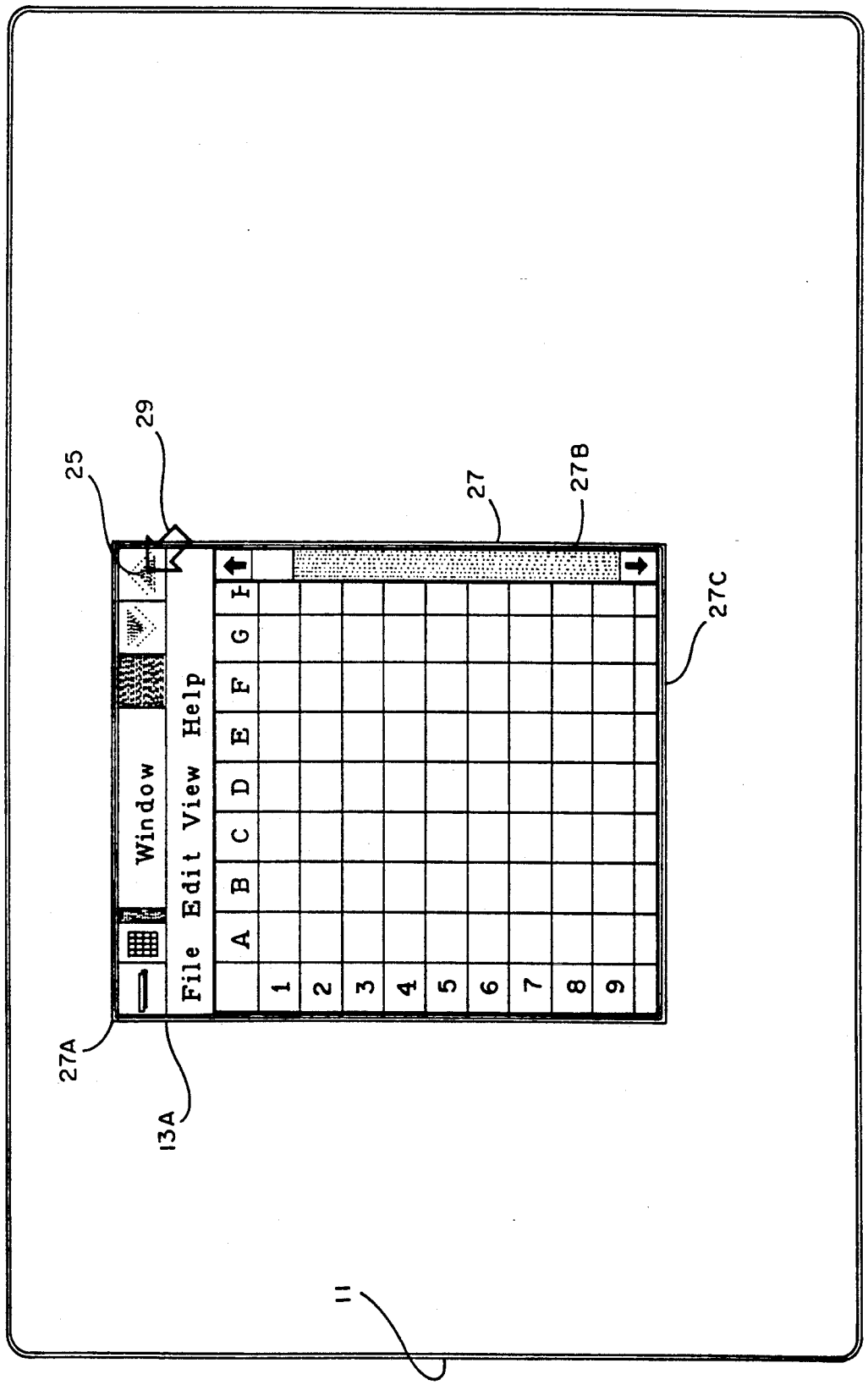
FIG. 2 is a schematic view of the screen of FIG. 1 after the window has been incrementally enlarged using the method of the present invention in accordance with a preferred embodiment.
Figure 3:
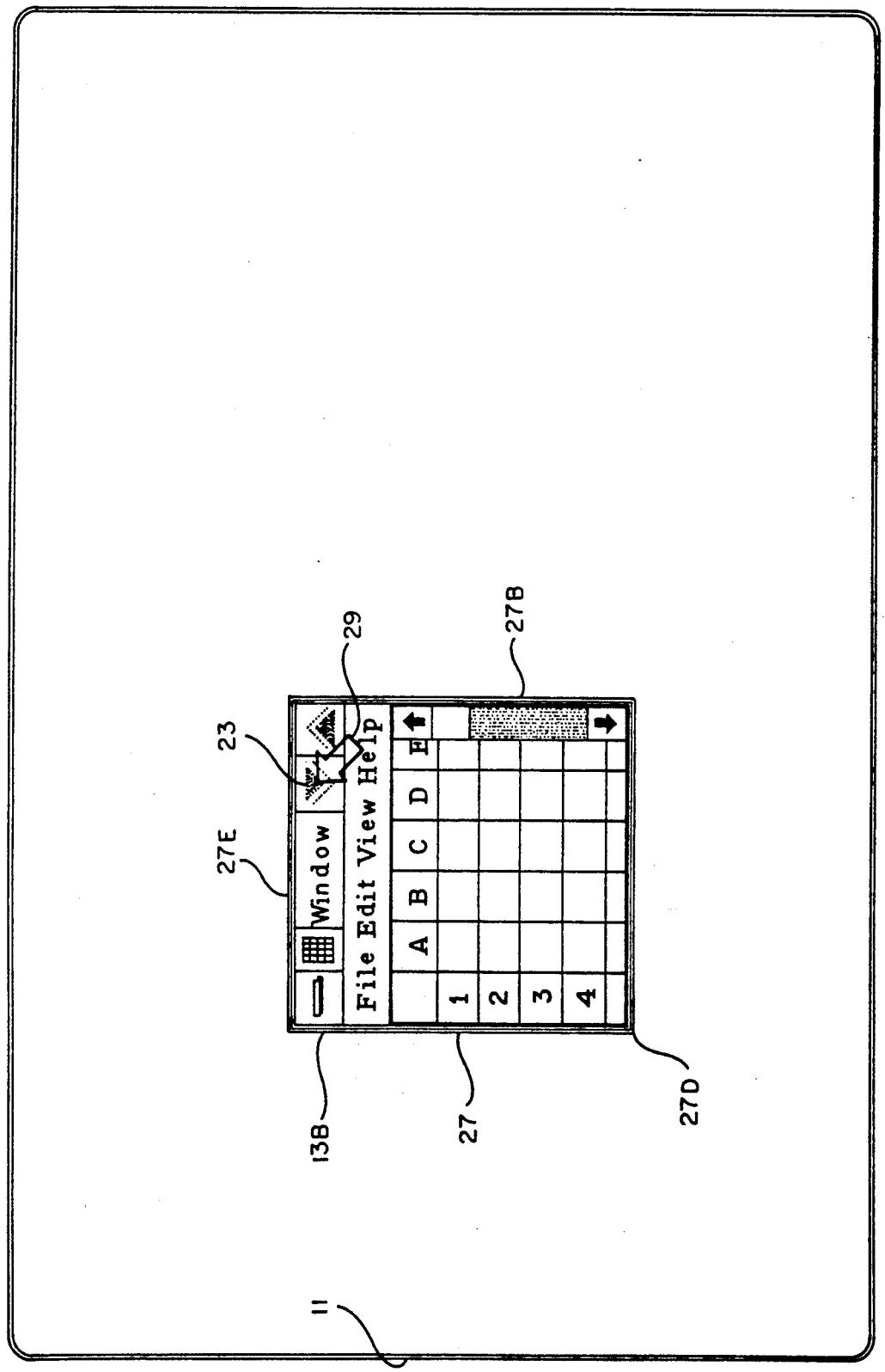
FIG. 3 is a schematic view of the screen of FIG. 1 after the window has been incrementally reduced in size using the method of the present invention.

To increase the size of the window 13, the mouse pointer 29 is moved to the enlarge icon 25. The operator then selects the icon, wherein the window 13A enlarges slightly, as shown in FIG. 2. If a mouse is being used by the operator, the selection of the icon is performed by clicking once the appropriate mouse button (typically mouse button 1). The window is incrementally enlarged on the screen by moving the borders 27. The enlarged window 13A displays more of the image of the application in the window. In particular, the window has been enlarged to display a portion of column H and also row 9 of the application program. (In FIGS. 2 and 3, the incremental changes are exaggerated for illustrative purposes.)

As the window is enlarged, one corner is fixed in position on the screen, at least until the window borders abut against the edges of the screen. In the preferred embodiment, the upper left-hand corner 27A is fixed. Thus, the right and bottom borders 27B, 27C move when the window is enlarged.

To decrease the size of the window 13, the mouse pointer 29 is moved to the reduce icon 23. The operator then selects that icon and the window 13B is incrementally reduced from its size in FIG. 1 (see FIG. 3). (As used herein, the term "increment" encompasses both enlargement by positive incrementation and reduction by negative incrementation.) The reduced window displays less of the image of the application program. In particular, the window has been reduced to display only columns A-E and rows 1-4. Columns F and G and rows 5-8 have been eliminated from the screen.

As the window is reduced, one corner is fixed in position on the screen. In the preferred embodiment, the lower left-hand corner 27D is fixed. Thus, the upper and right borders 27E, 27B are moved as the window is reduced.

The mouse pointer 29 remains attached to the respective sizing icon as the window changes size. As the window is enlarged, the mouse pointer 29 remains attached to the enlarge icon 25. Likewise, as the window is reduced, the mouse pointer 29 remains attached to the reduce icon 23. This aspect is useful whenever the user performs multiple increments on the window size. The user need not reposition the pointer after each incremental change in window size. To achieve multiple increments, the user locates the pointer 29 on the appropriate icon and then presses and holds the appropriate mouse button. The window will expand or contract for as long as the button is held down.

Figure 4:
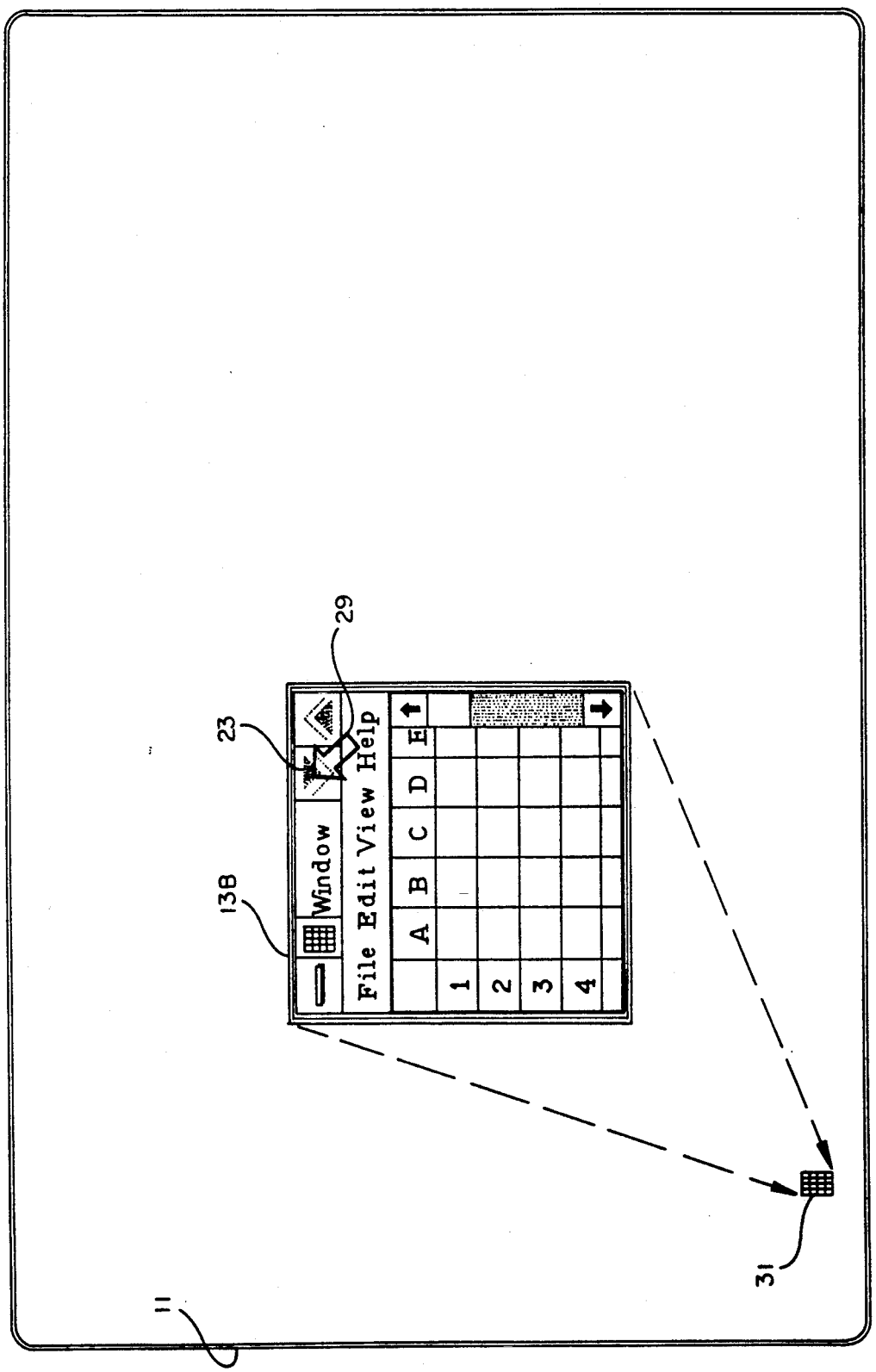
FIG. 4 is a schematic view of the screen of FIG. 3 showing schematically the reduction of the window to an icon

The window can be expanded to fill the entire screen by positioning the printer 29 on the enlarge icon 25 and then "double-clicking" the mouse button. Conversely, the window can be reduced to an icon 31, as shown in FIG. 4, by positioning the pointer 29 on the reduce icon 23 and then double-clicking the mouse button.

Figure 12:
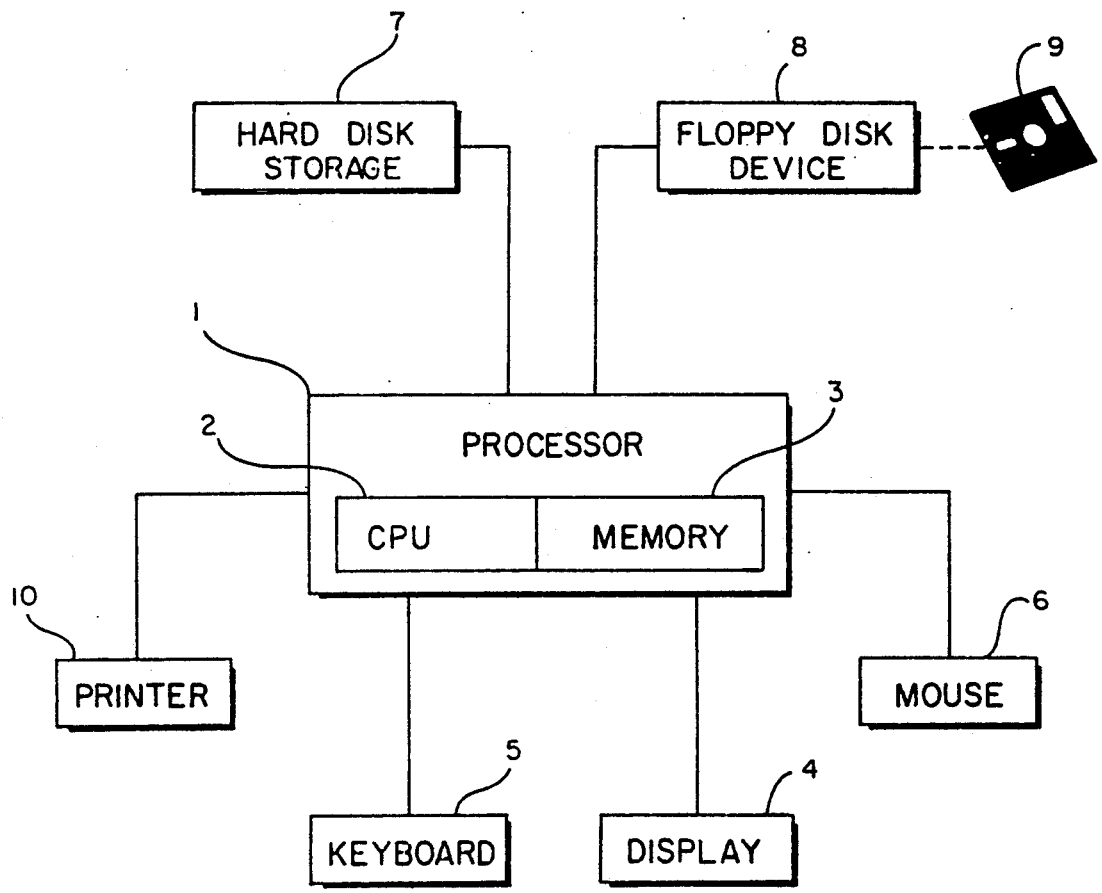
FIG. 12 is a block diagram showing a data processing system in accordance with the present invention.

In FIG. 12, there is shown a data processing system. The system has a processor 1, which itself has a central processor unit 2 and memory 3, such as RAM and/or ROM, located therein. Peripheral devices are connected to the processor. A display unit 4, containing the display screen 11, is connected to the processor 1. Input devices, in the form of a keyboard 5 and mouse 6, are also connected to the processor 1. Memory devices, in the form of hard disk storage 7 and a floppy disk device 8, are connected to the processor. The floppy disk device receives a floppy disk 9, which is a computer readable medium. The floppy disk 9 has computer program logic recorded thereon, which logic incrementally adjusts the size of the window on the display screen 11. There is also provided a printer 10 connected with the processor 1.

The method of incrementally changing window size will now be described with reference to the flow charts of FIGS. 5-9. In the flow charts, the following graphical conventions are observed: a diamond for a test or decision, a rectangle for a process or function and a circle for a connector in exiting to or entering from another part of the flow chart. These conventions are well understood by programmers skilled in the art, and the flow charts are sufficient to enable a programmer skilled in the art to write code in any suitable computer programming language, such as BASIC, PASCAL or C for a computer such as the IBM Personal System/ 2 (PS/2) family of computers which supports these languages.

Figure 5:
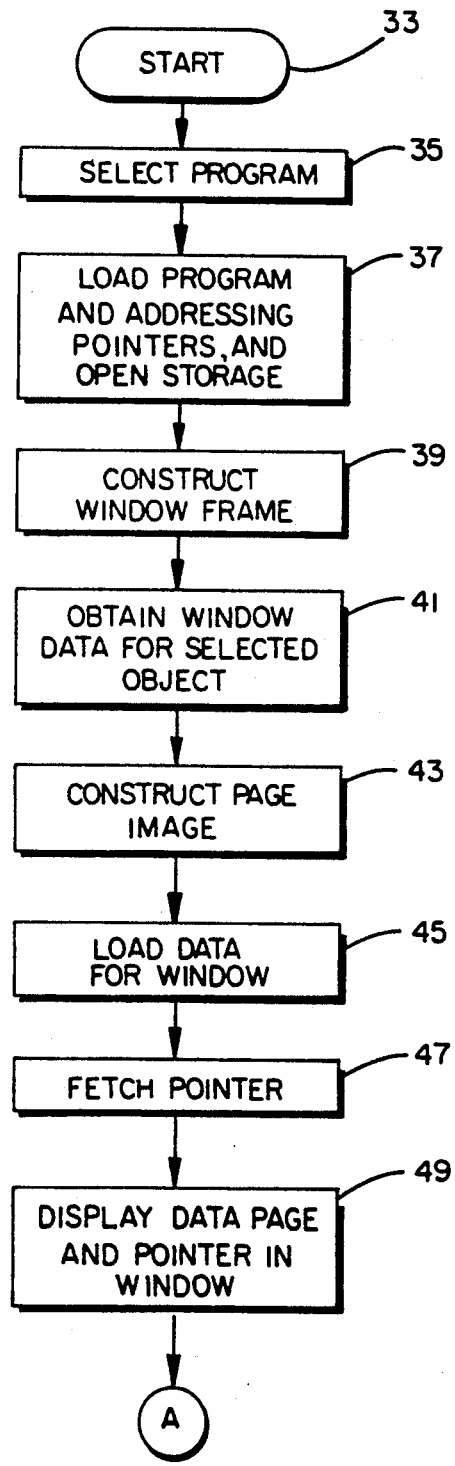
FIGS. 5-9 are flow charts of the method of the present invention.

Referring to FIG. 5, the computer is, in step 33, started and initialized. Then, the particular application program is selected by the user, step 35. This could typically involve the user positioning the mouse pointer on an icon or some other representation on the screen and then selecting that icon or representation. The application program and addressing pointers are loaded from storage, such as a hard disk, into RAM, step 37. The RAM storage is opened to receive the program and pointers.

The computer then constructs the window frame in memory, step 39. The outer borders are constructed, together with any icons that are used inside of the window. Next, the data which is to be located inside of the window is obtained and placed in memory, step 41. This step includes obtaining column and row headings, any graphics that are utilized and the numeric and alphabetic data. At this point, the data that is obtained may contain data that will not be displayed on the screen because it falls outside of the window border 27. The page image of the window is constructed and loaded into the display buffer, step 43, wherein the window is painted or displayed on the screen 11. The data for the window is loaded in step 45 into memory. In step 45, the data which is to be displayed in the window is selected. For example in FIG. 1, the data includes columns A-G and rows 1-8. Next, the pointer is fetched, step 47. This is the visual image of the mouse pointer 29. The data page and pointer are then displayed, step 49, in the window on the screen as shown in FIG. 1. The window 13 is now constructed and opened on the screen 11. The user may proceed to utilize the application program in the window.

After the window and its contents have been displayed or painted onto the screen, the user input is monitored, step 51, (see FIG. 6) for a command to change the window size. When an input is received, the method determines if the input is to make the window bigger, step 53. If the result of step 53 is YES, make the window bigger, then the next step is to proceed with the increase window size subroutine 55, shown in FIG. 7. The user provides a make window bigger input by positioning the mouse pointer 29 on the enlarge icon 25 and selecting that icon with a single click. After the increase window size subroutine 55 has been completed, the method returns to step 51 to monitor the user input. If the result of step 53 is NO, then the next determination is made, step 57, wherein it is determined if the input is to maximize the window size. If the result of step 57 is YES, then the next step 59 is to proceed with a conventional subroutine 59 for maximizing the window. The window size is maximized to fill the screen. After the window size has been maximized, the method returns to step 51 to monitor the user input.

If the result of step 57 is NO, then the next determination is made, step 61, to determine if the window should be made smaller. If the result of step 61 is YES, then the next step is to proceed with the reduce window size subroutine 63, shown in FIG. 9. The user provides a make window smaller input by positioning the mouse pointer 29 on the reduce icon 23 and selecting that icon with a single click. After the reduce window size subroutine 63 has been completed, the method returns to step 51 to monitor the user input. If the result of step 61 is NO, then the method proceeds to step 65 where it is determined if the window size should be minimized. If the result of step 65 is YES, minimize the window, then the method proceeds to step 67, which is a conventional subroutine for minimizing the window to an icon. After the window has been reduced to an icon 31, as shown in FIG. 4, then the method returns to step 51 to monitor the user input.

If the result of step 65 is NO, the method proceeds to step 69 to determine if the increment size is to be customized. If the result of step 69 is YES, customize the increment size, the method proceeds to step 71, which is a subroutine for allowing the user to interactively select the increment size. One way to provide a customize input is to utilize a customize selection in a pull-down menu. After the customize subroutine 71 is performed, the method returns to step 51 to monitor the user input.

If the result of step 69 is NO, then the method proceeds to step 73. In step 73, the appropriate function corresponding to the user input is performed. This would be a user input that is not related to changing the size of the window After step 73, the method returns to step 51 to monitor the user input.

Figure 6:
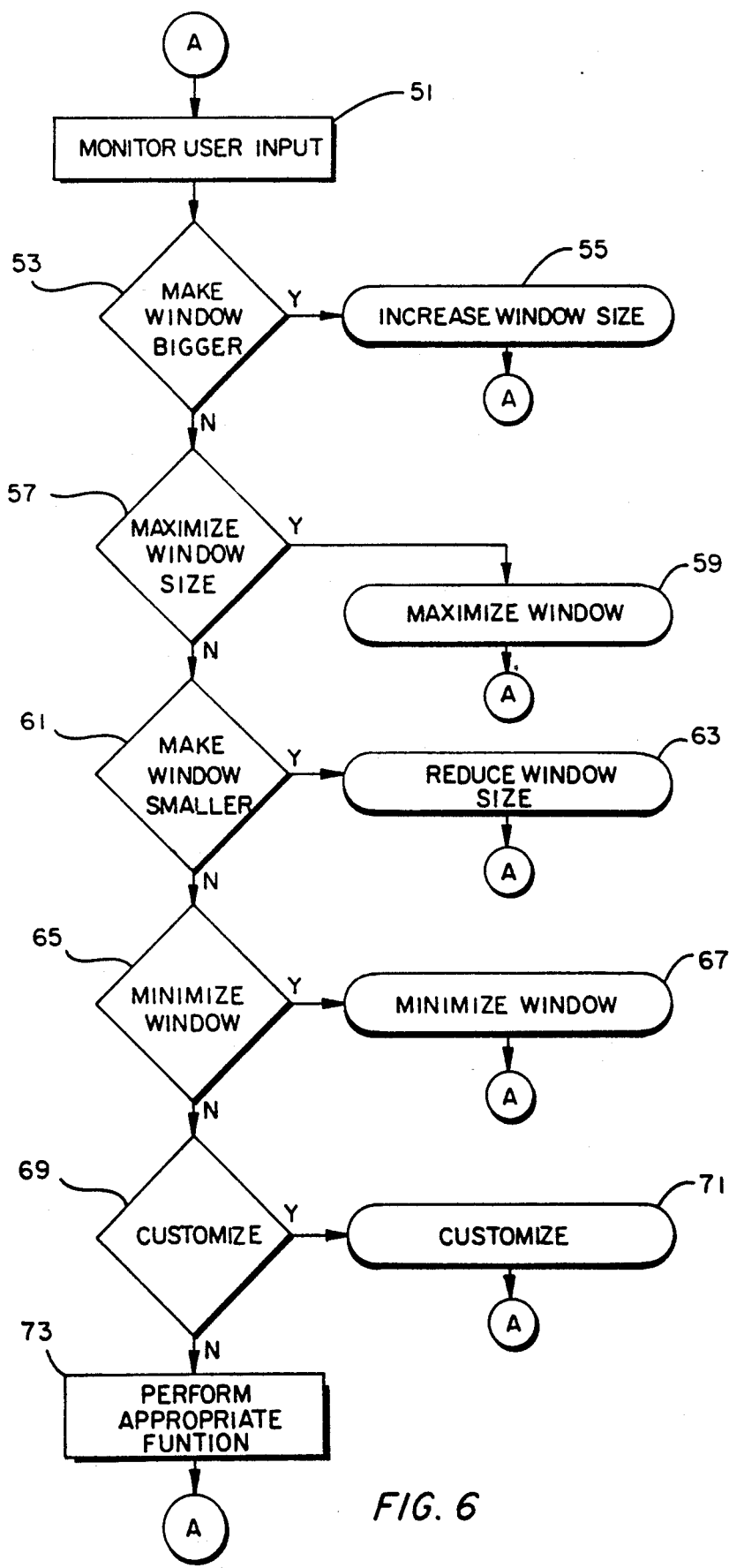
Figure 7:
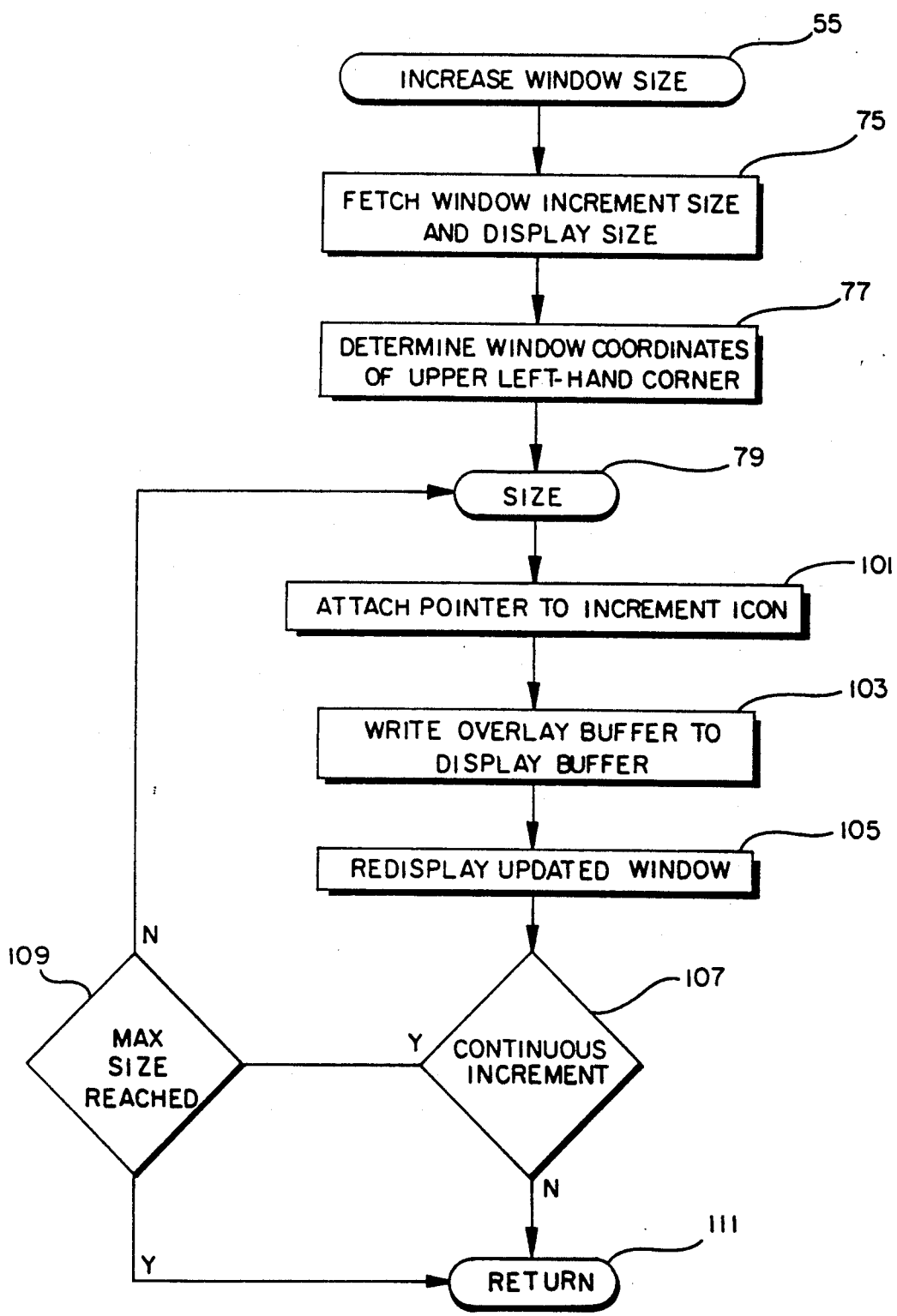
Figure 8:
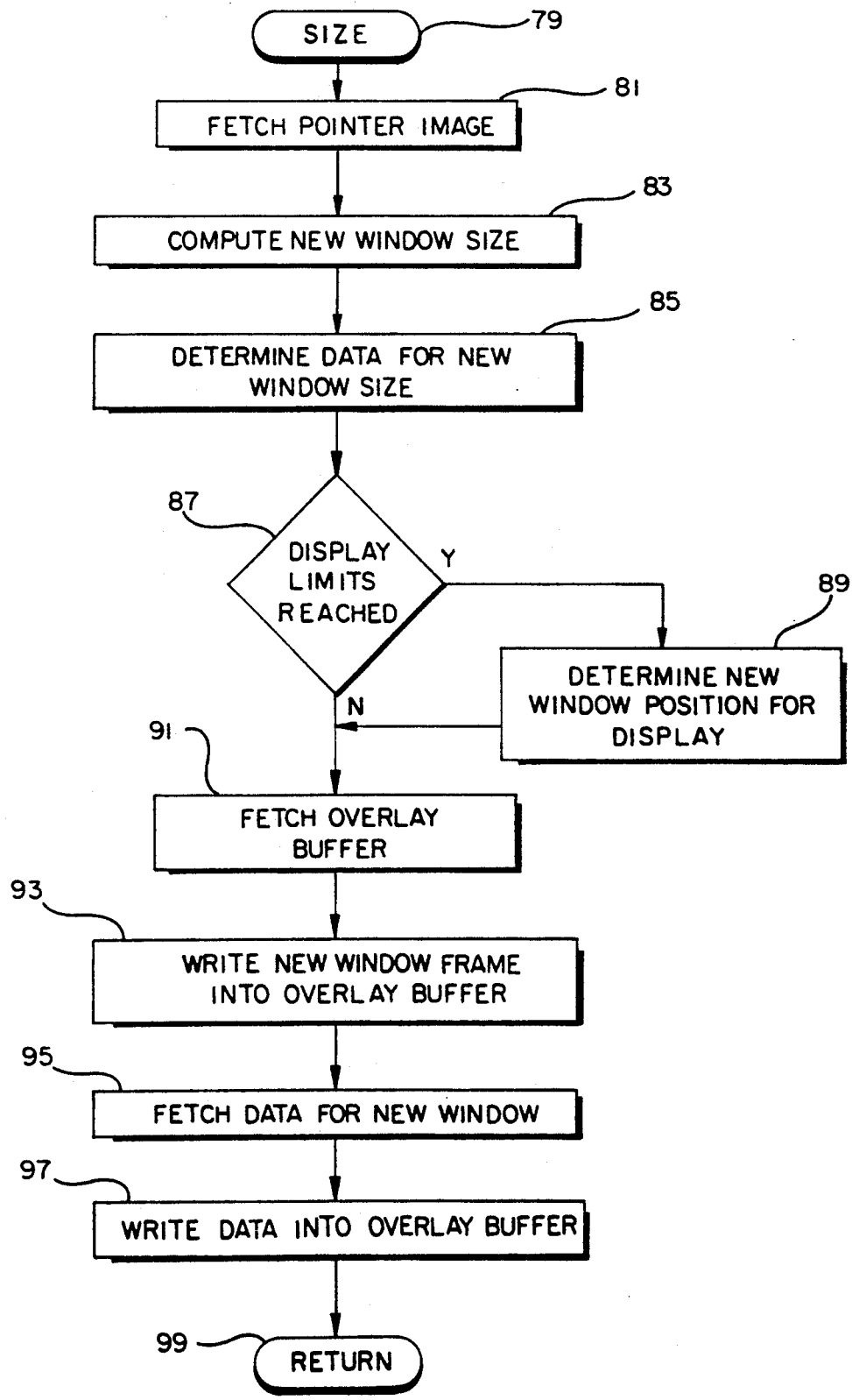

Referring to FIG. 7, the increase window size subroutine 55 will now be described. This subroutine 55 is performed if the result of step 53 in FIG. 6 is YES. The first step 75 is to fetch the window increment size and the display size. Unless the window increment size is set by the user in the customize subroutine 71, which will be described in more detail hereinafter, a default value is used. Next, in step 77, the screen coordinates of the upper left-hand corner 27A of the window are determined. These are x-y coordinates that are stored in memory. The upper left-hand corner 27A serves as a fixed point during the incremental expansion of the window.

The method then proceeds to a size subroutine 79, which is utilized by both the increase window size subroutine 53 and the reduce window size subroutine 63. The size subroutine (see FIG. 8) computes the new window size, and also determines the data that is to be displayed in the newly sized window.

The first step 81 of the size subroutine 79 is to fetch the pointer image. This step 81 fetches the coordinates of the mouse pointer 29 on the display screen 11. Next, in step 83, the new window size is computed. If the window is being enlarged, the new window size is computed by adding the increment value (or values) to the vertical and horizontal dimensions. If the window is being reduced, the increment value (or values) is subtracted from the vertical and horizontal dimensions to compute the new window size. The sizes of the title bar 15 and the action bar 17 are adjusted accordingly. Also, the sizing icons 23, 25 are repositioned accordingly. In step 85, the data for the new window size is determined. The data is that portion of the application program that will be visible inside of the new window. For example, if the window is being enlarged as shown in FIG. 2, the data now includes a portion of column H and row 9.

Next, in step 87, the method determines if the display limits have been reached. As the window is enlarged, the upper left hand corner is fixed, while the right border and bottom border 27B, 27C are moved. If either the right or bottom borders reach the edge of the screen 11, then YES the display limits have been reached and the method proceeds to step 89 to reposition the upper left hand corner 27A of the window. This is to allow the window to fill the entire screen. In step 89, the new coordinates for the upper left hand corner are determined. After the new coordinates have been determined, the overlay buffer is fetched, step 91. If the result of step 87 is NO, the method bypasses step 89 and proceeds directly to step 91. In step 91, a portion of memory is set up for the construction of the newly sized window. In step 93, the new window frame is written into the overlay buffer. Next, the data for the new window is fetched, step 95. This is the data that has been determined in step 85. In step 97, the data fetched in step 95 is written into the overlay buffer. The method than returns, step 99, to the calling subroutine, which in the case of enlarging the window is subroutine 55.

Upon returning to the increase window size subroutine 55, FIG. 7, the next step 101 attaches the pointer 29 to the increment or enlarge icon 25 of the newly sized window 13A. This provides dynamic pointer positioning so that as the window enlarges, the pointer 29 remains positioned on the enlarge icon 25. Thus, the user need not have to track the movement of the enlarge icon with the mouse pointer during expansion of the window; tracking is done automatically by the method of the present invention. Next, the overlay buffer is written to the display buffer, step 103. In step 105, the updated window is redisplayed onto the screen 11 as the newly sized window 13A, as shown in FIG. 2. Thus, the user sees the screen change from the window 13 shown in FIG. 1 to the window 13A shown in FIG. 2.

Because a single incremental increase may be insufficient to the user, the method monitors the input to determine if a continuous increment is being called for, step 107. The user provides a continuous increment input by pressing and holding the appropriate mouse button. The continuous increment is where the dynamic positioning and tracking of the pointer on the appropriate sizing icon is very helpful to the user.

If, YES, a continuous increment is being called for, then the method proceeds to step 109, where it is determined if the maximum size has already been reached. If the window does not yet fill the entire screen, then NO, the maximum size has not been reached, and the window can still be enlarged. The method returns to the size subroutine 79, wherein the window is increased by another incremental value. If, in step 107 there is NO continuous increment input, or in step 109 the maximum size has been reached, then the method terminates the increase window size subroutine 55 and returns 111 to monitor the user input, step 51 (see FIG. 6).

Figure 9:
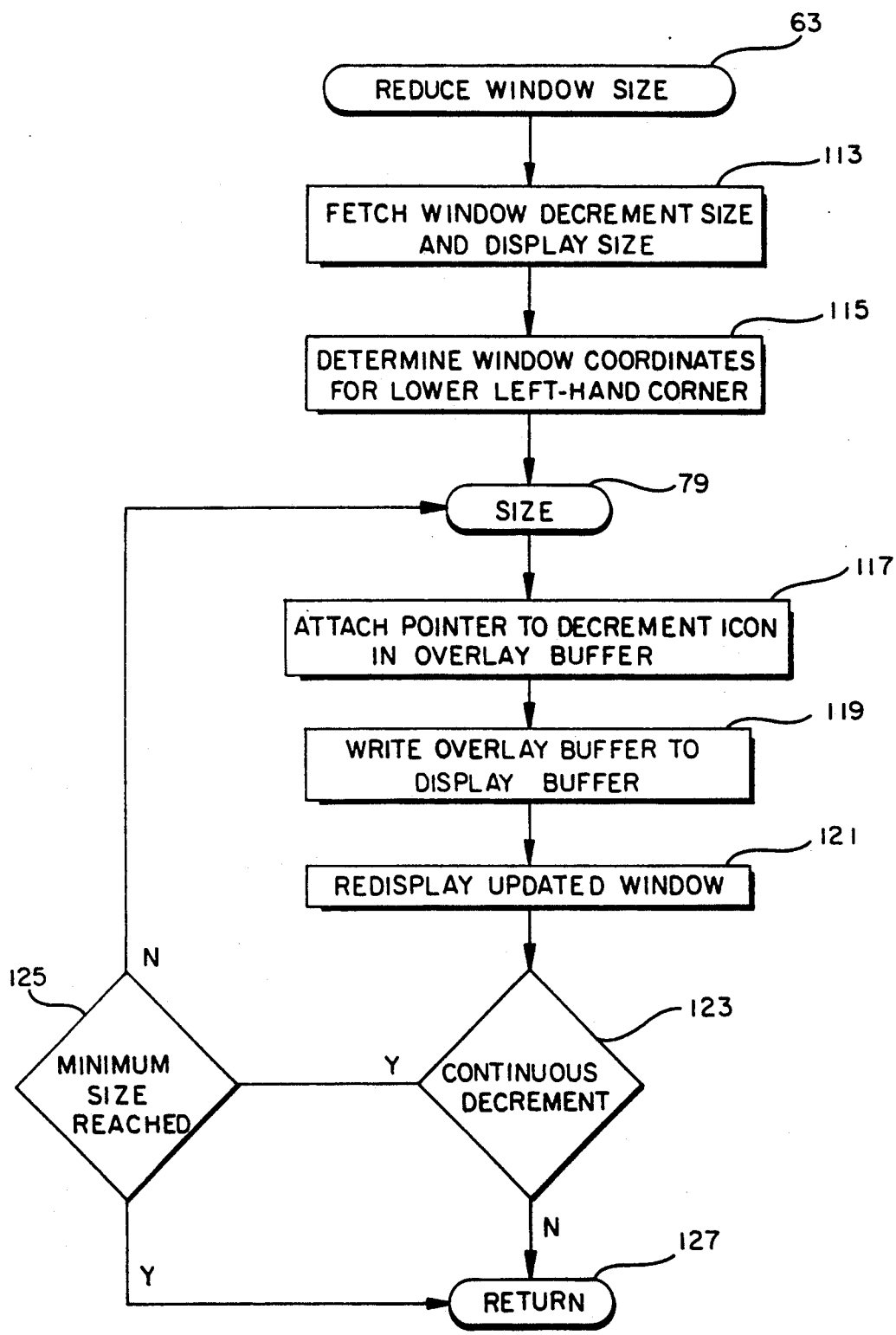

Referring to FIG. 9, the reduce window size subroutine 63 will now be described. This subroutine 63 is similar to the increase window size subroutine 55, except that the window is reduced instead of being enlarged. The first step 113 is to fetch the window decrement size and display size. Next, the coordinates of the lower left-hand corner 27D of the window are determined, step 115. The lower left-hand corner serves as a fixed point during the incremental reduction of the window. Then, the method proceeds to the size subroutine 79 to compute the new window size and determine the data to be displayed in the newly sized window, as described hereinabove.

After the size subroutine 79, the next step 117 attaches the mouse pointer 29 to the decrement or reduce icon 23 in the overlay buffer. In step 119, the overlay buffer is written to the displayed buffer. In step 121, the updated, or reduced, window is displayed on the screen 11. Thus, the user sees the screen change from the window 13 shown in FIG. 1 to the window 13B shown in FIG. 3.

In step 123, the method checks to see if the user is inputting a continuous decrement. If YES, then the method proceeds to step 125, which determines if the minimum size has been reached. If, in step 125, NO, the minimum size has not been reached, then the method returns to the size subroutine 79, wherein the window is reduced by another decremental value. If, in step 123 there is NO continuous decrement, or in step 125 the minimum size has been reached, then the method terminates the subroutine 63 and returns 127 to monitor the user input, step 51 (see FIG. 6).

In some instances, it is desirable to allow the user to select the incremental sizing values to meet individual needs. The method provides for dynamic selection, so that the user can see on the screen the results of his choice of incremental values.

Figure 10:
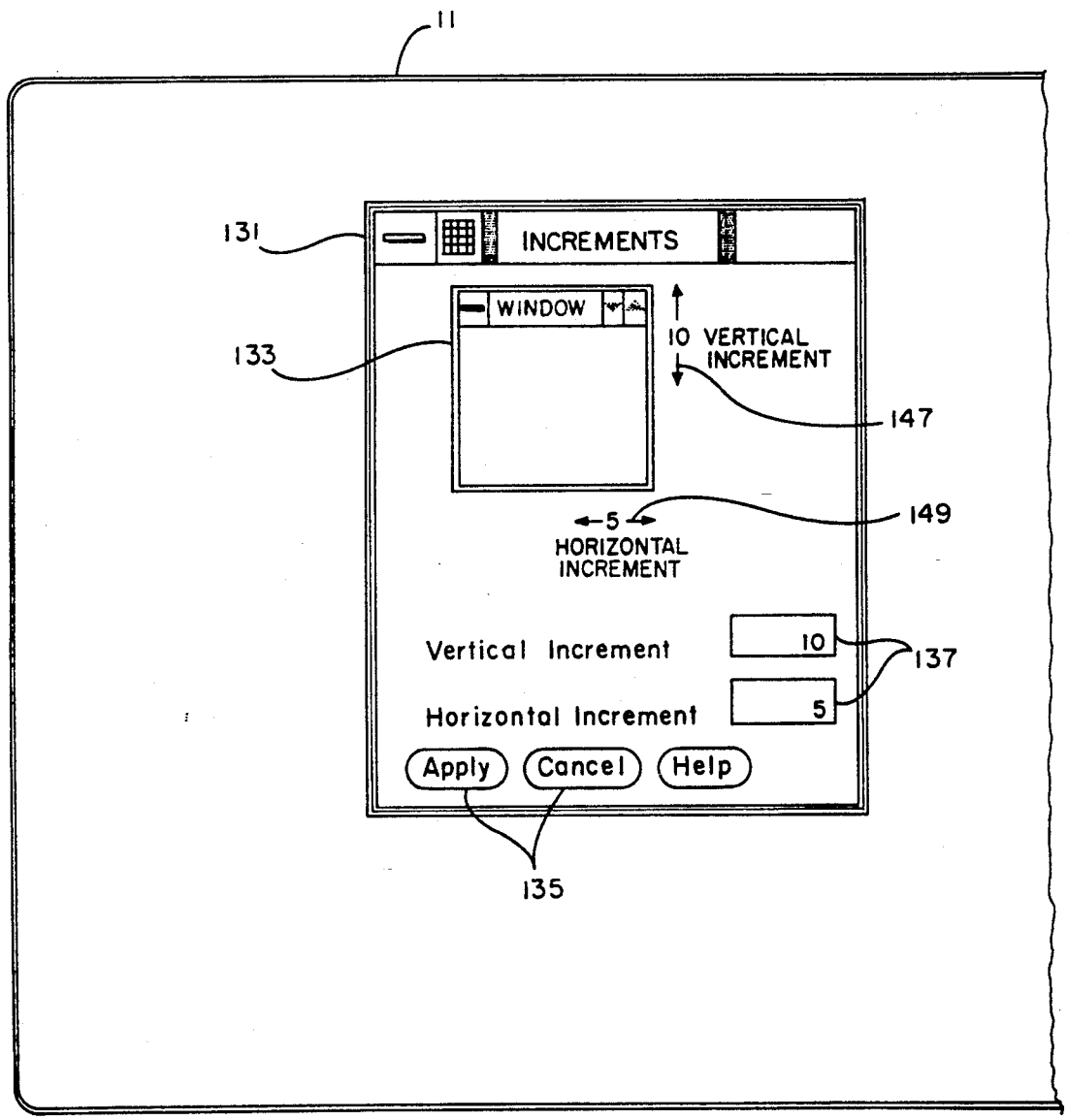
FIG. 10 is a schematic view of a portion of the screen, showing a window for use in customizing the size of the increments used in the method of the present invention.

When the user selects the customize feature a pop-up window or dialog box 131, with the title "INCREMENTS", is displayed on the screen, as shown in FIG. 10. A miniature version of the current window 133 is shown inside of the client area of the increments window 131, along with push buttons 135 and prompts 137. The user inputs the vertical and horizontal increments, wherein the method updates the miniature window 133 in accordance with the newly input incremental values. This allows the user to see on the screen the effect of his choice. If the user is dissatisfied with the result, new incremental values can be input, with the method resizing the window 133 according to the newly input values.

Figure 11:
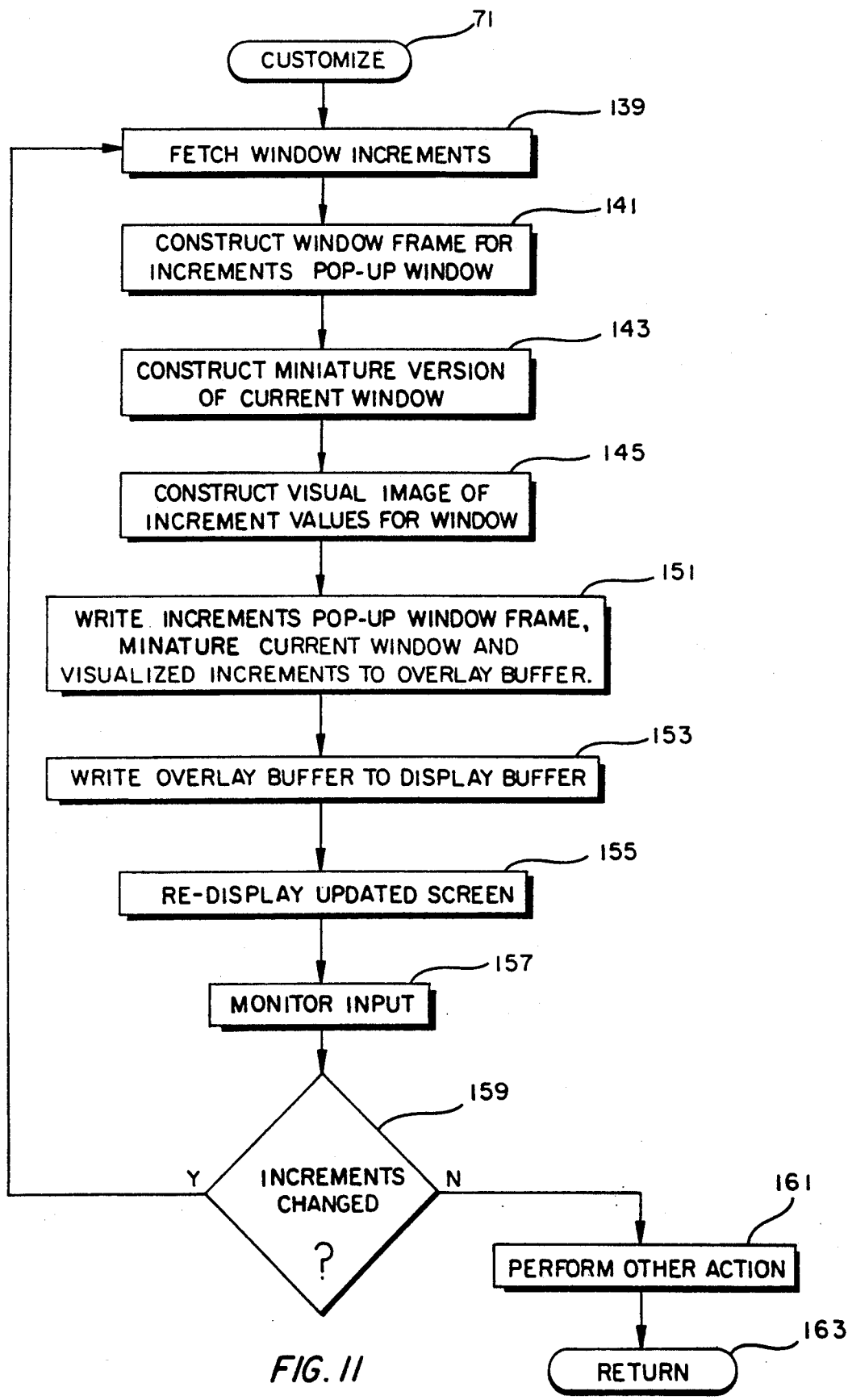
FIG. 11 is a flow chart of the customizing subroutine.

Referring now to the flow chart shown in FIG. 11, the customize subroutine 71 will now be described. As discussed above, one way to enter the customize subroutine 71 is to utilize a customize selection in a pulldown menu. In step 139, the vertical and horizontal window increments are fetched. Then, in step 141, the window frame for the increments pop-up window 131 is constructed. The miniature version 133 of the current window is also constructed, step 143. In step 145, a visual image of the increment values for the miniature window 133 is constructed. There is a vertical increment visual image 147 and a horizontal increment visual image 149, as shown in FIG. 10. These images display the increment size both numerically, in pels, and graphically using dimension lines. Also, the visual image of the push buttons 135 and the prompts 137 are constructed. In step 151, the increments pop-up window frame 131, the miniature window 133 and the visualized increments 147, 149 are written to the overlay buffer. In addition, the push buttons 135 and the prompts 137 are also written to the overlay buffer. The overlay buffer is then written to the display buffer, step 153. Then, the updated screen is redisplayed, step 155.

Next, user inputs into the prompts 137 are monitored, step 157. When an input is received, it is evaluated to see if the increment values have been changed, step 159. If YES, then the method proceeds to step 139, where the newly input increment values are fetched. Steps 141 through 155 are repeated, wherein the miniature window 133 is changed in size in accordance with the newly input incremental values and the visual images 147, 149 are updated. If the result in step 159 is NO, the increments are not to be changed, then other appropriate actions corresponding to the input are performed, step 161. The method then returns 163 to step 51 to monitor user input.

The foregoing disclosure and the drawings made in the drawings are merely illustrative of the principles of this invention and are not to be interpreted in a limiting sense.

We claim:

1. A method for incrementally adjusting the size of a window in a user interface with a data processing system, comprising the steps of:
   a) displaying said window on said interface, said window having data located therein;
   b) displaying on said interface an enlarge icon and a reduce icon;
   c) detecting a user input for changing the size of said window, said input comprising a first selection of said enlarge icon, a second selection of said enlarge icon, a first selection of said reduce icon and a second selection of said reduce icon; interface;
   d) identifying said detected user input as being one of said first or second selections of said enlarge icon or said first or second selections of said reduce icon;
   e) determining a new window size according to said detected and identified user input by respectively enlarging or reducing said new window size, according to a predetermined incremental value if said first selection of said enlarge icon or said first selection of said reduce icon is respectively detected, or by enlarging or reducing said new window size according to a respective predetermined maximum or minimum size if said second selection of said enlarge icon or said second selection said reduce icon is respectively selected;
   f) determining new data that is to be located in said new window;
   g) displaying said new window and said new data located therein on said interface.

2. The method of claim 1 wherein said window has plural border segments around a perimeter of said window, said step of forming said new window occurring by holding at least one border segment fixed in position on said interface while the remaining border segments move relative to said fixed border segment.

3. The method of claim 2 further comprising the step of determining if a border segment of said new window reaches a limit on said interface, wherein if said limit is reached, repositioning said fixed border segment of said new window so that said new window can be viewed in its entirety on said interface.

4. The method of claim 1 wherein said user input is performed by locating an interface cursor on a selected one of said enlarge or reduce icons, further comprising the step of attaching said cursor to said selected icon in said new window, wherein said cursor is automatically repositioned on said selected icon as said window changes size.

5. The method of claim 1 further comprising the steps of allowing said user to select predetermined incremental value.

6. A method for incrementally adjusting the size of a window in a user interface with a data processing system, comprising the steps of:
   a) displaying said window on said interface, said window having data located therein;
   b) displaying on said interface an enlarge icon and a reduce icon;
   c) detecting a user input for changing the size of said window, said input comprising a selection of either said enlarge icon or said reduce icon; interface;
   d) determining a new window size according to a predetermined incremental value so as to form a new window, said new window size being in accordance with said user input, said incremental value being predetermined such that said new window size undergoes plural increments of said incremental value to obtain a predetermined maximum size or a predetermined minimum size;
   e) determining new data that is to be located in said new window;
   f) displaying said new window and said new data located therein on said interface;
   g) determining if said user input is continuous, wherein if said user input is continuous then repeating steps d) - f) until said user input terminates or until said new window reaches said predetermined maximum size or said predetermined maximum size.

7. The method of claim 6 wherein said window has plural border segments around a perimeter of said window, said step of forming said new window occurring by holding at least one border segment fixed in position on said interface while the remaining border segments move relative to said fixed border segment.

8. The method of claim 7 further comprising the step of determining if a border segment of said new window reaches a limit on said interface, wherein if said limit is reached, repositioning said fixed border segment of said new window so that said new window can be viewed in its entirety on said interface.

9. The method of claim 6, further comprising the steps of:
   a) determining if said user requests to provide said incremental value;
   b) displaying a sizing window on interface;
   c) detecting an incremental value input from said user;
   d) determining a new sizing window size according to said incremental value input so as to form a new sizing window;
   e) displaying said new sizing window on said interface.

10. A method for incrementally adjusting the size of a window in a user interface with a data processing system, comprising the steps of:
    a) displaying said window on said interface, said window having data located therein;
    b) displaying on said interface an enlarge icon and a reduce icon;
    c) detecting a user input for changing the size of said window, said input comprising a selection of either said enlarge icon or said reduce icon by a cursor on said interface;
    d) determining a new window size according to a predetermined incremental value so as to form a new window, said new window size being enlarged or reduced in accordance with said detected user input, said new window having newly positioned enlarge and reduce icons;
    e) determining new data that is to be located in said new window;
    f) attaching said cursor to said selected and newly positioned icon so as to form a newly positioned cursor;
    g) displaying said new window and said new data located therein and said newly positioned cursor on said interface.

11. The method of claim 10 further comprising the step of determining if said user input is continuous, wherein if said user input is continuous then repeating steps d) - g) until said user input terminates or until said new window reaches a predetermined maximum size or a predetermine minimum size.

12. A data processing system, comprising:
a) interface means for displaying information from said system to a user;
means for displaying said information on said interface means, said means for displaying said information being connected to said interface means, aid information being displayed on said interface means comprising a window and data located inside of said window, said information also including an enlarge icon and a reduce icon;
c) means for detecting a user input for changing the size of said window, said input comprising a first selection of said enlarge icon, a second secretion of said enlarge icon, a first selection of said reduce icon and a second selection of said reduce icon;
d) means for identifying said detected user input as being one of said first and second selections of said enlarge icon and said first and second selections of said reduce icon;
e) means for determining a new window size according to said detected user input, said means for determining a new window size comprising means for respectively enlarging or reducing said window according to a predetermined incremental value which is respectively responsive to said first selection of said enlarge icon and to said first selection of said reduce icon, and also comprising means for respectively enlarging or reducing said window according to a predetermined maximum or minimum size which is respectively responsive to said second selection of said enlarge icon and to said second selection of said reduce icon, said incremental value being predetermined such that said new window size undergoes plural increments of said incremental value to obtain either said maximum or said minimum size, said means for determining a new window size being connected to said means for detecting said input and to said means for displaying said information such that a new window in accordance with a new window size is displayed on said interface means.

13. A data processing system, comprising:
a) interface means for displaying information from said system to a user;
b) means for displaying said information on said interface means, said means for displaying said information being connected to said interface means, said information being displayed on said interface means comprising a window and data located inside of said window, said information also including an enlarge icon and a reduce icon;
c) means for detecting a user input for changing the size of said window, said input comprising a selection of either said enlarge icon or said reduce icon by a cursor on said interface means;
d) means for determining a new window size according to a predetermined incremental value, said new window size being enlarged or reduced in accordance with said detected user input, said means for determining a new window size determining new positions of said enlarge and reduce icons on said interface means and determining a new position of said cursor so as to attach said cursor to said selected and newly positioned icon on said interface means, said means for determining a new window size being connected to said means for detecting said input and to said means for displaying said information such that a new window in accordance with said new window size is displayed on said interface means.

14. The method of claim 1, further comprising the step of determining if said user input is continuous, wherein if said user input is continuous then repeating steps e) - g) until said user input terminates or until said new window reaches a predetermined maximum size or said predetermined minimum size.

15. The method of claim 1 wherein said input is obtained by a cursor being positioned on one of said icons on said interface and said new window has newly positioned enlarge and reduce icons, further comprising the steps of:
a) attaching said cursor to said selected and newly positioned icon so as to form a newly positioned cursor;
b) displaying the newly positioned cursor on the interface along with the new window and new data located therein.

16. The data processing means of claim 12, wherein said input is obtained by a cursor being positioned on one of said icons on said interface means, said means for determining a new window size also being for determining new positions of said enlarge and reduce icons on the interface means and determining a new position of said cursor so as to attach said cursor to said selected and newly positioned icon on said interface means.

17. The data processing means of claim 13, wherein said input is obtained by a cursor being positioned on one of said icons on said interface means, said means for determining a new window size also being for determining new positions of said enlarge and reduce icons on the interface means and determining a new position of said cursor so as to attach said cursor to said selected and newly positioned icon on said interface means.

* * * * *

UNITED STATES PATENT AND TRADEMARK OFFICE
CERTIFICATE OF CORRECTION

PATENT NO : 5,227,771
DATED : July 13, 1993
INVENTOR(S): Linda L. Kerr, Robert J. Torres It is certified that error appears in the above-identified patent and that said Letters Patent is hereby corrected as shown below:

In col. 9, line 63, delete "interface;".

In col. 10, line 12, change the second occurrence of "maximum" to --minimum--.

Signed and Sealed this

First Day of December, 1998

Attest:

BRUCE LEHMAN

Attesting Officer     Commissioner of Patents and Trademarks